United States Patent
Kim et al.

(10) Patent No.: US 11,183,859 B2
(45) Date of Patent: Nov. 23, 2021

(54) APPARATUS FOR PREVENTING OVER-DISCHARGE

(71) Applicant: LG CHEM, LTD., Seoul (KR)

(72) Inventors: Kyung-Jik Kim, Daejeon (KR); Young-Su Son, Daejeon (KR); Jin-Hyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 135 days.

(21) Appl. No.: 16/621,161

(22) PCT Filed: Mar. 6, 2019

(86) PCT No.: PCT/KR2019/002625
§ 371 (c)(1),
(2) Date: Dec. 10, 2019

(87) PCT Pub. No.: WO2019/177303
PCT Pub. Date: Sep. 19, 2019

(65) Prior Publication Data
US 2020/0127483 A1    Apr. 23, 2020

(30) Foreign Application Priority Data

Mar. 12, 2018 (KR) .................. 10-2018-0028619

(51) Int. Cl.
*H02J 7/00* (2006.01)
(52) U.S. Cl.
CPC ........ *H02J 7/00306* (2020.01); *H02J 7/0029* (2013.01); *H02J 7/0047* (2013.01); *H02J 7/00302* (2020.01); *H02J 7/0031* (2013.01)
(58) Field of Classification Search
CPC .... H02J 7/0029; H02J 7/0047; H02J 7/00302; H02J 7/00306
(Continued)

(56) References Cited

U.S. PATENT DOCUMENTS

2001/0054880 A1*  12/2001  Haraguchi ........... H02J 7/0021
                                                   320/134
2009/0254290 A1   10/2009  Kim et al.
(Continued)

FOREIGN PATENT DOCUMENTS

EP    2 822 132 A1    1/2015
JP    2005-52000 A    2/2005
(Continued)

OTHER PUBLICATIONS

Extended European Search Report for European Application No. 19768505.0, dated Oct. 23, 2020.
(Continued)

*Primary Examiner* — Edward Tso
*Assistant Examiner* — Aaron Piggush
(74) *Attorney, Agent, or Firm* — Birch, Stewart, Kolasch & Birch, LLP (57) ABSTRACT

An apparatus for preventing over-discharge of a battery includes: a first switch between a battery cell and an output terminal; a second switch having one end and another end respectively electrically connected to one end of the first switch and to the output terminal; a current limiting resistor located between a first node located between the first switch and the second switch and a second node located between the second switch and the output terminal; a third switch having one end and another end respectively electrically connected to another end of the current limiting resistor and to the second node; and a processor to set a reference voltage by using at least one of a minimum operating voltage of the battery cell, a first drop voltage by the current limiting resistor and a second drop voltage by an internal resistor of the battery cell.

18 Claims, 3 Drawing Sheets

(58) Field of Classification Search
USPC .................................. 320/134, 136, 153, 163
See application file for complete search history.

(56) References Cited

U.S. PATENT DOCUMENTS

| | | |
|---|---|---|
| 2011/0304302 A1 | 12/2011 | Kim |
| 2013/0113430 A1 | 5/2013 | Kim |
| 2013/0249494 A1 | 9/2013 | Ju et al. |
| 2014/0159664 A1 | 6/2014 | Yoshida |
| 2016/0201634 A1* | 7/2016 | Kim .................. H01M 10/486 |
| | | 320/136 |

FOREIGN PATENT DOCUMENTS

| | | |
|---|---|---|
| JP | 2013-183561 A | 9/2013 |
| JP | 2013-201890 A | 10/2013 |
| JP | 2015-173569 A | 10/2015 |
| JP | 5835009 B2 | 12/2015 |
| KR | 10-2007-0096646 A | 10/2007 |
| KR | 10-0962856 B1 | 6/2010 |
| KR | 10-2011-0135289 A | 12/2011 |
| KR | 10-2015-0006695 A | 1/2015 |
| KR | 10-2015-0033882 A | 4/2015 |
| KR | 10-2015-0083740 A | 7/2015 |
| KR | 10-2015-0091890 A | 8/2015 |
| KR | 10-2016-0044239 A | 4/2016 |
| KR | 10-2017-0071949 A | 6/2017 |
| WO | WO 2013/008409 A1 | 1/2013 |
| WO | WO 2016/060356 A1 | 4/2016 |

OTHER PUBLICATIONS

International Search Report (PCT/ISA/210) issued in PCT/KR2019/002625, dated Jun. 24, 2019.

* cited by examiner

APPARATUS FOR PREVENTING OVER-DISCHARGE

TECHNICAL FIELD

The present application claims priority to Korean Patent Application No. 10-2018-0028619 filed on Mar. 12, 2018 in the Republic of Korea, the disclosures of which are incorporated herein by reference.

The present disclosure relates to an apparatus for preventing over-discharge, and more particularly, to an apparatus for preventing over-discharge by gradually decreasing an output of a battery.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance secondary batteries allowing repeated charging and discharging are being actively studied.

Secondary batteries commercially available at present include nickel-cadmium batteries, nickel hydrogen batteries, nickel-zinc batteries, lithium secondary batteries and the like. Among them, the lithium secondary batteries are in the limelight since they have almost no memory effect compared to nickel-based secondary batteries and also have very low self-discharging rate and high energy density.

Meanwhile, the secondary battery may be used as a single secondary battery, but a plurality of secondary batteries are connected in series and/or in parallel, in order to serve as a high-voltage and/or large-capacity power storage system, or in the form of a battery pack including a battery management system for controlling overall charge/discharge operations of the secondary batteries included therein.

A battery management system used in the battery pack monitors the state of the battery by using a temperature sensor, a current sensor, a voltage sensor or the like and uses the monitoring result to estimate SOC and SOH, balance the voltage between battery cells or protect the battery from overcharge, overdischarge, high voltage, overcurrent, low temperature and high temperature.

In particular, the battery management system may include a protection circuit to prevent the battery from being over-discharged to have a voltage lower than a minimum operating voltage. For example, the battery management system has a switch on a discharge path of the battery, and if the voltage of the battery drops below a preset minimum operating voltage, the battery management system turns off the switch to block discharge of the battery, thereby preventing overdischarge of the battery.

In the overdischarge prevention technology of the conventional battery management system, the output of the battery is blocked when the voltage of the battery drops below the minimum operating voltage, so a system powered by the battery may suddenly turn off.

DISCLOSURE

Technical Problem

The present disclosure is directed to providing an apparatus for preventing over-discharge, which prevents over-discharge of a battery cell by setting a reference voltage using a minimum operating voltage and drop voltages of a current limiting resistor whose resistance varies according to its own temperature and an internal resistor of the battery cell and then controlling an electric connection of the current limiting resistor based on a comparison result of a cell voltage of the battery cell and the reference voltage.

The objects of the present disclosure are not limited to the above, and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided an apparatus for preventing over-discharge, comprising: a first switch located on a first discharge path that electrically connects a battery cell and an output terminal; a second switch located on the first discharge path and having one end and the other end respectively electrically connected to the other end of the first switch and the output terminal; a current limiting resistor located on a second discharge path that electrically connects a first node located between the first switch and the second switch and a second node located between the second switch and the output terminal, the current limiting resistor having one end electrically connected to the first node; a third switch located on the second discharge path and having one end and the other end respectively electrically connected to the other end of the current limiting resistor and the second node; and a processor configured to set a reference voltage by using at least one of a minimum operating voltage of the battery cell, a first drop voltage by the current limiting resistor and a second drop voltage by an internal resistor of the battery cell and control operation states of the first switch, the second switch and the third switch based on the reference voltage.

Preferably, the processor may be configured to calculate the first drop voltage by using a variable resistance of the current limiting resistor according to temperature and a discharge current of the battery cell.

Preferably, the processor may be configured to calculate the second drop voltage by using an internal resistance of the battery cell according to temperature and a discharge current of the battery cell.

Preferably, the processor may be configured to calculate the reference voltage by using the following equation:

$$V_{ref} = V_{min} + I_o R_v + I_o R_i \qquad \text{<Equation>}$$

where $V_{ref}$ is the reference voltage, $V_{min}$ is the minimum operating voltage of the battery cell, $I_o$ is a discharge current of the battery cell, $R_v$ is a variable resistance of the current limiting resistor according to temperature, and $R_i$ is an internal resistance of the battery cell according to temperature.

Preferably, the processor may be configured to control the operation states of the first switch and the second switch into a turn-on state and the operation state of the third switch into a turn-off state, when an output request signal is received.

Preferably, the processor may be configured to compare a cell voltage of the battery cell with the reference voltage and control the operation states of the first switch, the second switch and the third switch according to the comparison result.

Preferably, the processor may be configured to control the operation states of the first switch and the third switch into a turn-on state and the operation state of the second switch into a turn-off state, when the cell voltage of the battery cell is equal to or lower than the reference voltage.

A battery management system according to the present disclosure may comprise the apparatus for preventing over-discharge.

A battery pack according to the present disclosure may comprise the apparatus for preventing over-discharge.

An electronic device according to the present disclosure may comprise the apparatus for preventing over-discharge.

Advantageous Effects

According to the present disclosure, a reference voltage is set using a minimum operating voltage and drop voltages of a current limiting resistor whose resistance varies according to its own temperature and an internal resistor of the battery cell, and then the flow of a current flowing through the current limiting resistor is controlled based on a comparison result of a cell voltage of the battery cell and the reference voltage, thereby preventing overdischarge of the battery cell. Also, since the output of the battery cell is gradually decreased, it is possible to prevent the power supplied to a load from being blocked at once.

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise. Furthermore, the term "processor" described in the specification refers to a unit that processes at least one function or operation, and may be implemented by hardware, software, or a combination of hardware and software.

In addition, throughout the specification, when a portion is referred to as being "connected" to another portion, it is not limited to the case that they are "directly connected", but it also includes the case where they are "indirectly connected" with another element being interposed between them.

Figure 1:
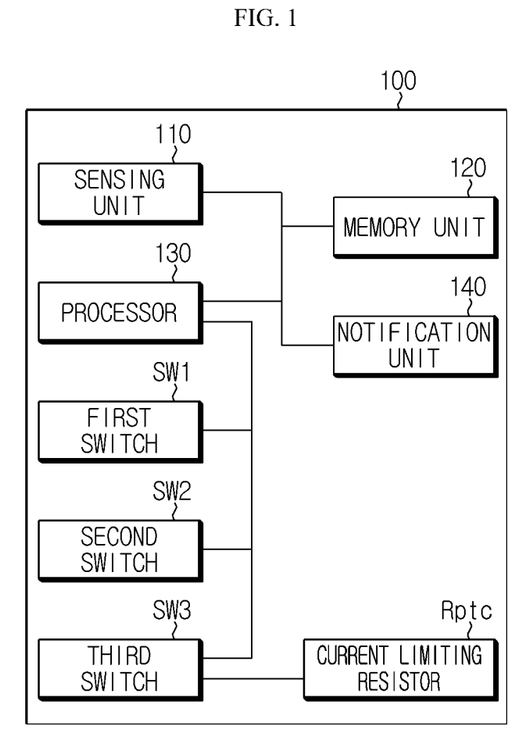
FIG. 1 is a diagram showing a configuration of an apparatus for preventing over-discharge according to an embodiment of the present disclosure.
Figure 2:
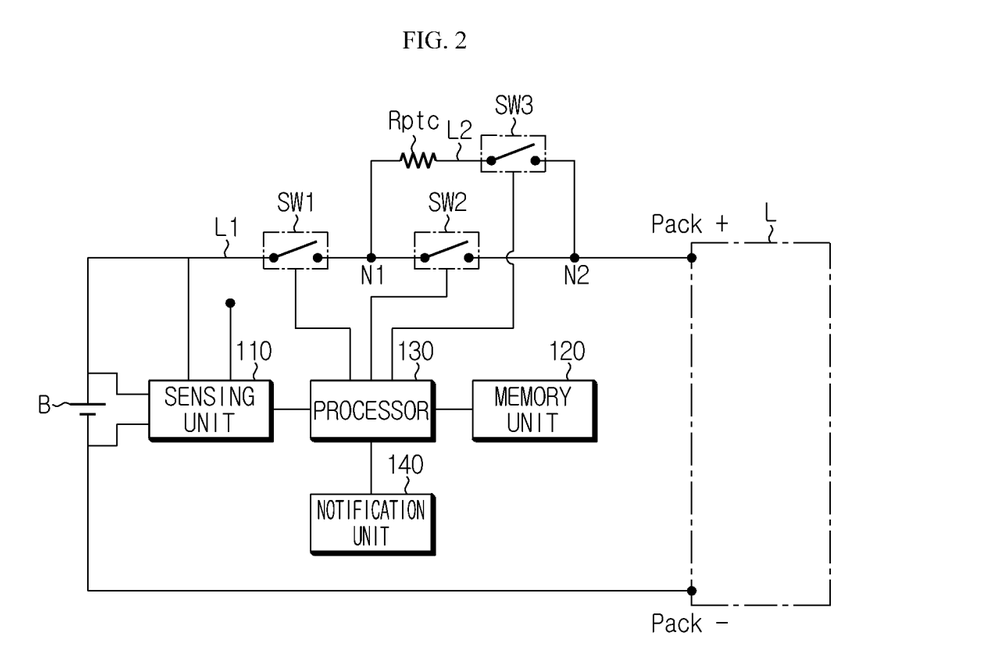
FIG. 2 is a diagram schematically showing a connection configuration of the apparatus for preventing over-discharge according to an embodiment of the present disclosure, a battery pack and a load.

FIG. 1 is a diagram showing a configuration of an apparatus for preventing over-discharge according to an embodiment of the present disclosure, and FIG. 2 is a diagram schematically showing a connection configuration of the apparatus for preventing over-discharge according to an embodiment of the present disclosure, a battery pack and a load.

First, referring to FIGS. 1 and 2, an apparatus for preventing over-discharge 100 according to an embodiment of the present disclosure is included in an electronic device having a battery pack and is connected to a battery cell B provided in the battery pack to prevent overdischarge of the battery cell B.

Meanwhile, the apparatus 100 for preventing over-discharge according to an embodiment of the present disclosure may be included in a battery management system (BMS) provided in the battery pack.

The apparatus 100 for preventing over-discharge may include a first switch SW1, a second switch SW2, a current limiting resistor Rptc, a third switch SW3, a sensing unit 110, a memory unit 120, a processor 130, and a notification unit 140.

The battery pack includes a plurality of battery cells B electrically connected in series and/or in parallel, and the battery cell B is a minimum unit cell whose change in electrode response resistance is diagnosed. Here, the case where the battery pack includes only one unit cell is also included in the scope of the present disclosure.

The battery cell B is not particularly limited to any kind as long as it allows repeated charge and discharge. For example, the battery cell B may be a lithium polymer battery made of a pouch type.

The battery cell B may be electrically coupled to various electronic devices through output terminals Pack+, Pack−. The electronic device may be a traveling device driven by electric power. For example, the electronic device may be an electric vehicle, a hybrid electric vehicle, an unmanned aerial vehicle such as a drone, a large-capacity energy storage system (ESS) included in a power grid, or a mobile device.

Thus, the battery cell B may output power to the output terminals Pack+, Pack− to supply power to a load L provided in the electronic device.

For example, if the electronic device connected to the battery cell B is a drone, the battery cell B may supply power to a motor, which is the load L provided in the drone, by outputting power to the output terminals Pack+, Pack−.

Meanwhile, the first switch SW1 may be located on a first discharge path L1 that electrically connects the battery cell B and the output terminals Pack+, Pack−.

The first switch SW1 may output power from the battery cell B to the output terminals Pack+, Pack− or block the output power.

The second switch SW2 is located on the first discharge path L1, and one end and the other end of the second switch SW2 may be electrically connected to the other end of the first switch SW1 and the output terminals Pack+, Pack−, respectively.

That is, on the first discharge path L1 that electrically connects the battery cell B and the output terminals Pack+, Pack−, the first switch SW1 may be located closer to the battery cell B than the second switch SW2, and the second switch SW2 may be located closer to the output terminals Pack+ than the first switch SW1.

Meanwhile, the current limiting resistor Rptc is located on a second discharge path L2 that electrically connects a first node N1 located between the first switch SW1 and the second switch SW2 and a second node N2 located between the second switch SW2 and the output terminals Pack+, and one end of the current limiting resistor Rptc may be electrically connected to the first node N1.

The third switch SW3 is located on the second discharge path L2, and one end and the other end of the third switch SW3 may be electrically connected to the other end of the current limiting resistor Rptc and the second node N2, respectively.

That is, on the second discharge path L2 that electrically connects the first node N1 and the second node N2, the current limiting resistor Rptc may be located closer to the first node N1 than the third switch SW3, and the third switch SW3 may be located closer to the second node N2 than the current limiting resistor Rptc.

Accordingly, if the operation state of the first switch SW1 is controlled into a turn-off state, the power output from the battery cell B to the output terminals Pack+ and Pack− may be blocked regardless of the operation states of the second switch SW2 and the third switch SW3.

If the operation state of the first switch SW1 is controlled into a turn-on state, the operation state of the second switch SW2 is controlled into a turn-off state and the operation state of the third switch SW3 is controlled into a turn-on state, the power output from the battery cell B may be output to the output terminals Pack+, Pack− through the second discharge path L2.

If the operation state of the first switch SW1 is controlled into a turn-on state and the operation state of the second switch SW2 is controlled into a turn-on state, regardless of the operation state of the third switch SW3, the power output from the battery cell B may be output to the output terminals Pack+, Pack− through the first discharge path L1.

Meanwhile, the current limiting resistor Rptc may be a positive temperature coefficient (PTC) device whose variable resistance rapidly increases when a threshold temperature is reached. Accordingly, if current flows through the current limiting resistor Rptc until the threshold temperature is reached, the current flowing through the second discharge path L2 may be blocked. That is, if a current flows through the current limiting resistor Rptc for a predetermined time, the power output from the battery cell B through the second discharge path L2 may be blocked.

The sensing unit 110 may measure data that are to be used by the processor 130 in setting a reference voltage, explained later.

To this end, the sensing unit 110 may provide measurement signals representing a cell voltage applied to both ends of the battery cell B at preset periods, a discharge current of the battery cell B flowing from the battery cell B to the first discharge path L1, a temperature of the battery cell B, and a ambient temperature of the current limiting resistor Rptc to the processor 130.

The sensing unit 110 may include a voltage sensor configured to measure a battery voltage applied to both ends of the battery cell B. Also, the sensing unit 110 further includes a current sensor configured to measure a discharge current of the battery cell B flowing from the battery cell B to the first discharge path L1. Also, the sensing unit 110 further includes a temperature sensor configured to measure a temperature of the battery cell B and an ambient temperature of the current limiting resistor Rptc.

If the measurement signal is received from the sensing unit 110, the processor 130 may determine a digital value of each of the cell voltage, the discharge current, the temperature of the battery cell B and the ambient temperature of the current limiting resistor Rptc by means of signal processing and store the digital values in the memory unit 120.

The memory unit 120 is a semiconductor memory device that records, erases and updates data generated by the processor 130, and stores a plurality of program codes prepared for diagnosing whether the battery cells B are cracked. In addition, the memory unit 120 may store preset values of various predetermined parameters used in implementing the present disclosure.

The memory unit 120 may is not particularly limited as long as it is a semiconductor memory element known in the art as being capable of recording, erasing and updating data. For example, the memory unit 120 may be DRAM, SDRAM, a flash memory, ROM, EEPROM, a register, and the like. In addition, the memory unit 120 may further include a storage medium that stores program codes defining the control logics of the processor 130. The storage medium includes a non-volatile storage element such as a flash memory or a hard disk. The memory unit 120 may be physically separate from the processor 130 or may be integrated with the processor 130.

First, the case where the processor 130 receives an output request signal for outputting the power of the battery cell B to the load L of the electronic device will be described.

Figure 3:
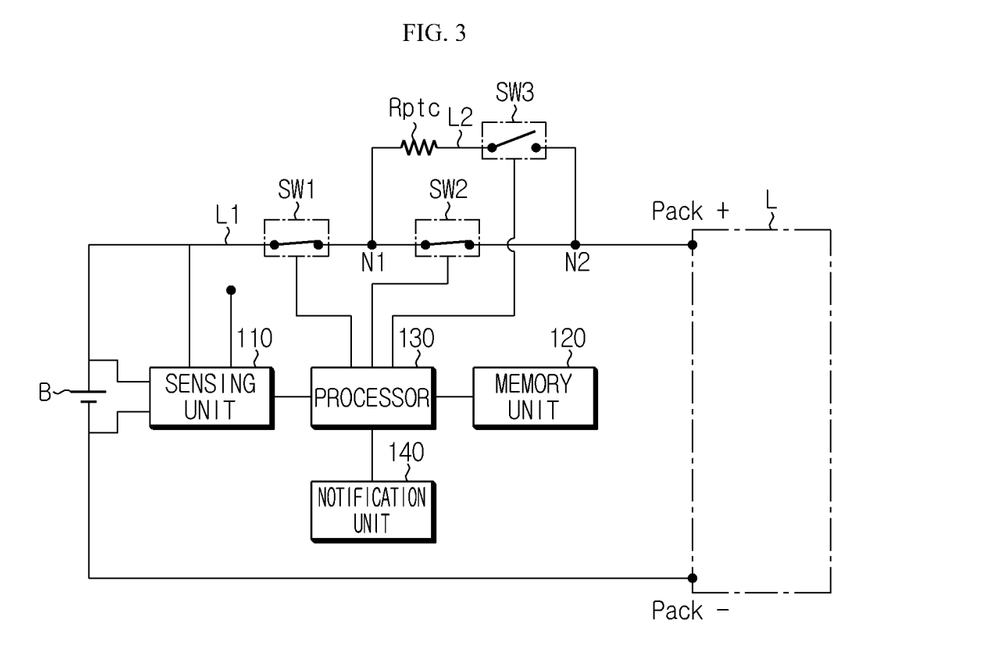
FIG. 3 is a diagram showing an example of switch control, when a processor of the apparatus for preventing over-discharge according to an embodiment of the present disclosure receives an output request signal.

FIG. 3 is a diagram showing an example of switch control, when a processor of the apparatus for preventing overdischarge according to an embodiment of the present disclosure receives an output request signal.

If the output request signal is received, the processor 130 may control the operation states of the first switch SW1 and the second switch SW2 into a turn-on state and control the operation state of the third switch SW3 into a turn-off state.

Accordingly, the power output from the battery cell B may be output to the load L through the first discharge path L1.

After that, the processor 130 may set a reference voltage by using at least one of a minimum operating voltage of the battery cell B, a first drop voltage by the current limiting resistor Rptc and a second drop voltage by an internal resistor of the battery cell B, and control the operation states of the first switch SW1, the second switch SW2 and the third switch SW3 based on the reference voltage.

Here, the minimum operating voltage of the battery cell B may be a voltage of the battery cell B which must be kept at least so that the battery cell B is not degraded due to overdischarge.

For example, the minimum operating voltage of the battery cell B may be "3V".

Meanwhile, the processor 130 may calculate the first drop voltage by using the variable resistance of the current limiting resistor Rptc and the discharge current of the battery cell B according to the temperature. That is, the processor 130 may calculate the first drop voltage, which is a drop voltage by the current limiting resistor Rptc, on the assumption that the power output from the battery cell B flows to the second discharge path L2 where the current limiting resistor Rptc is located.

At this time, the processor 130 may calculate the first drop voltage by using a first temperature-resistance look-up table in which the ambient temperature of the current limiting resistor Rptc measured by the sensing unit 110 is matched with the variable resistance of the current limiting resistor Rptc according to temperature. Here, the first temperature-resistance look-up table may be stored in advance in the memory unit 120.

The processor 130 may read the variable resistance of the current limiting resistor Rptc corresponding to the ambient temperature of the current limiting resistor Rptc measured by the sensing unit 110 from the first temperature-resistance look-up table.

After that, the processor 130 may calculate the first drop voltage by multiplying the read variable resistance of the current limiting resistor Rptc by the discharge current of the battery cell B.

Meanwhile, the processor 130 may calculate the second drop voltage by using the internal resistance of the battery cell B and the discharge current of the battery cell B. That is, the processor 130 may calculate the second drop voltage, which is a drop voltage caused by the internal resistance of the battery cell B varying according to the temperature, rather than a resistance component of a circuit connected to the battery cell B.

At this time, the processor 130 may calculate the second drop voltage by using a second temperature-resistance look-up table in which the temperature of the battery cell B measured by the sensing unit 110 is matched with the internal resistance of the battery cell B according to temperature.

The processor 130 may read the internal resistance of the battery cell B corresponding to the temperature of the battery cell B measured by the sensing unit 110 from the second temperature-resistance look-up table. Here, the second temperature-resistance look-up table may be stored in advance in the memory unit 120.

After that, the processor 130 may calculate the second drop voltage by multiplying the internal resistance of the read battery cell B by the discharge current of the battery cell B.

Finally, the processor 130 may calculate the reference voltage by summing the minimum operating voltage of the battery cell B, the first drop voltage and the second drop voltage.

At this time, the processor 130 may calculate the reference voltage using Equation 1 below.

$$V_{ref} = V_{min} + I_o R_v + I_o R_i$$ <Equation 1>

Here, $V_{ref}$ is the reference voltage, $V_{min}$ is the minimum operating voltage of the battery cell, $I_o$ is the discharge current of the battery cell, $R_v$ is the variable resistance of the current limiting resistor according to temperature, and $R_i$ is the internal resistance of the battery cell according to temperature.

The processor 130 may compare the cell voltage of the battery cell B with the reference voltage and control the operation states of the first switch SW1, the second switch SW2 and the third switch SW3 according to the comparison result.

Figure 4:
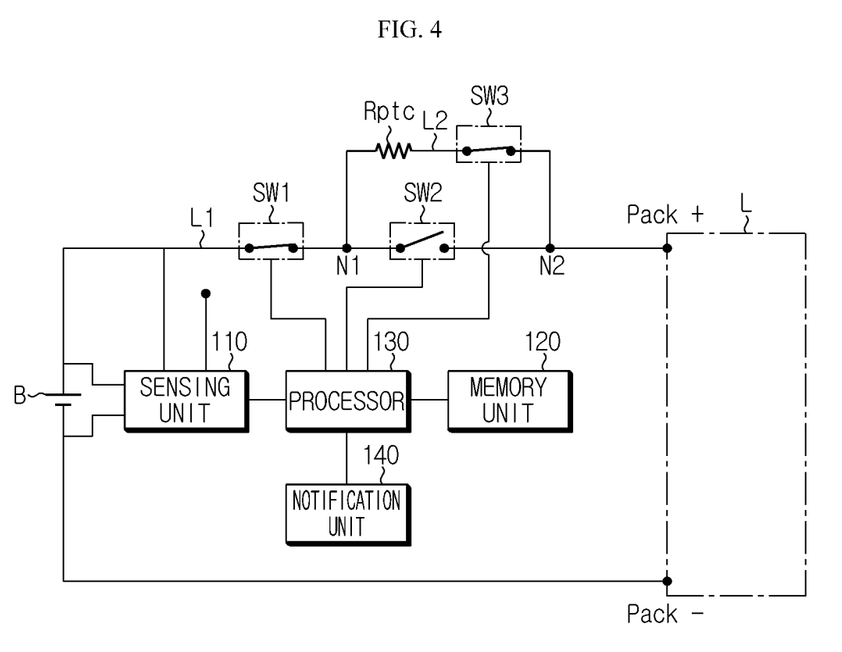
FIG. 4 is a diagram showing an example of switch control, performed by the processor of the apparatus for preventing over-discharge according to an embodiment of the present disclosure to prevent overdischarge.

More specifically, if the cell voltage of the battery cell B is equal to or lower than the reference voltage, the processor 130 may control the operation states of the first switch SW1 and the third switch SW3 into a turn-on state and control the operation state of the second switch SW2 into a turn-off state.

That is, if the cell voltage of the battery cell B is equal to or lower than the reference voltage, the processor 130 may output the power of the battery cell B, which has been output through the first discharge path L1, to the second discharge path L2.

Accordingly, the discharge current of the battery cell B may flow at the current limiting resistor Rptc. After that, as the discharge current keeps flowing through the current limiting resistor Rptc, the temperature of the current limiting resistor Rptc rises, which may rapidly increase the resistance of the variable resistor.

Finally, the current limiting resistor Rptc increases the variable resistance close to infinity as the discharge current flows, so that the discharge current flowing through the second discharge path L2 may be intercepted, which may gradually block the power output to the output terminals Pack+, Pack−.

According to this configuration of the present disclosure, if the voltage of the battery cell B is equal to or lower than the minimum operating voltage, the power output from the battery cell B to the load L is not immediately blocked, but the power may be gradually reduced in inverse proportion to the increasing variable resistance as the discharge current flows to the current limiting resistor Rptc.

Meanwhile, the processor 130 according to another embodiment may estimate an expected power blocking time by using the discharge current of the battery cell B and the ambient temperature of the current limiting resistor Rptc.

More specifically, the processor 130 according to another embodiment may estimate the expected power blocking time by using a current-time look-up table in which a threshold resistance reaching time of the current limiting resistor Rptc is matched with each initial current value flowing in the current limiting resistor Rptc.

Here, the current-time look-up table may be a look-up table in which a threshold resistance reaching time is matched so that, when a current flows through the current limiting resistor Rptc, the variable resistance of the current limiting resistor Rptc becomes close to infinity according to the initial current value of the corresponding current.

For example, if the initial current value of the current flowing first in the current limiting resistor Rptc is "5A" and the variable resistance of the current limiting resistor Rptc becomes close to infinity "10 sec" after the current of "5A" begins to flow in the current limiting resistor Rptc, the initial current value of "5A" and the threshold resistance reaching time of "10 sec" may be mapped and stored in the current-time look-up table. Here, the current-time look-up table may be stored in the memory unit 120.

If the cell voltage of the battery cell B is equal to or lower than the reference voltage, the processor 130 according to another embodiment may control the operation states of the first switch SW1 and the third switch SW3 into a turn-on state and control the operation state of the second switch SW2 into a turn-off state.

After that, the processor 130 according to another embodiment may read the threshold resistance reaching time from the current-time look-up table by using the current value of the discharge current flowing in the current limiting resistor Rptc.

The processor 130 according to another embodiment may estimate the read threshold resistance reaching time as the expected power blocking time. That is, the expected power blocking time may be a time when the power of the battery cell B is blocked after the processor 130 controls the operation states of the first switch SW1, the second switch SW2 and the third switch SW3 so that the discharge current flows through the current limiting resistor Rptc.

By using the configuration of the present disclosure, the time for blocking the output of the battery cell B supplied to the load L may be predicted in advance in order to prevent overdischarge of the battery cell B.

Meanwhile, the processor 130 may selectively include an application-specific integrated circuit (ASIC), another chipset, a logic circuit, a register, a communication modem, and a data processing device. At least one of the various control logics executable by the processor 1300 may be combined, and the combined control logic is written in a computer-readable code system and recorded on a computer-readable recording medium. The recording medium has no limitation as long as it can be accessed by the processor 130 included in a computer. As one example, the recording medium includes at least one selected from the group consisting of a ROM, a RAM, a register, a CD-ROM, a magnetic tape, a hard disk, a floppy disk and an optical data recording device. In addition, the code system may be modulated into a carrier signal and stored in a communication carrier at a specific time, and may be stored and executed in a distributed manner on computers connected through a network. Moreover, functional programs, code and segments for implementing the combined control logics may be easily inferred by programmers in the technical field to which the present disclosure belongs.

The notification unit 140 may receive the threshold resistance reaching time estimated by the processor 130 and outputs the threshold resistance reaching time to the outside. More specifically, the notification unit 140 may include at least one of a display unit for displaying the threshold resistance reaching time by using at least one of symbols, numbers and codes, and a speaker unit for outputting the threshold resistance reaching time with a sound.

Meanwhile, a battery management system according to the present disclosure may include the apparatus for preventing over-discharge described above. By doing so, it is possible to prevent overdischarge of the battery cell B managed by the battery management system.

Meanwhile, an electronic device according to the present disclosure may receive power from the battery cell B and includes the apparatus for preventing over-discharge described above.

The embodiments of the present disclosure described above are not necessarily implemented by apparatuses and methods but may also be implemented through a program for realizing functions corresponding to the configuration of the present disclosure or a recording medium on which the program is recorded. Such implementation may be easily performed by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

B: battery cell
L: load
100: apparatus for preventing over-discharge
110: sensing unit
120: memory unit
130: processor
140: notification unit
SW1: first switch
SW2: second switch
SW3: third switch
Rptc: current limiting resistor

What is claimed is:

1. An apparatus for preventing over-discharge of a battery, the apparatus comprising:
    a first switch located on a first discharge path that electrically connects a battery cell and an output terminal;
    a second switch located on the first discharge path and having one end and another end respectively electrically connected to one end of the first switch and to the output terminal;
    a current limiting resistor located on a second discharge path that electrically connects a first node located between the first switch and the second switch and a second node located between the second switch and the output terminal, the current limiting resistor having one end electrically connected to the first node, wherein the current limiting resistor is a positive temperature coefficient (PTC) device having a variable resistance that increases when a threshold temperature is reached;
    a third switch located on the second discharge path and having one end and another end respectively electrically connected to one end of the current limiting resistor and to the second node; and
    a processor configured to set a reference voltage by using at least one of a minimum operating voltage of the battery cell, a first drop voltage by the current limiting resistor and a second drop voltage by an internal resistor of the battery cell, and control operation states of the first switch, the second switch and the third switch based on the reference voltage,
    wherein when a cell voltage of the battery cell is equal to or lower than the minimum operating voltage of the battery cell, power output from the battery cell to a load is not immediately blocked, but the power is gradually reduced in inverse proportion to the increasing variable resistance as a discharge current flows through the current limiting resistor.

2. The apparatus for preventing over-discharge of a battery according to claim 1, wherein the processor is configured to calculate the first drop voltage by using the variable resistance of the current limiting resistor according to a temperature and a discharge current of the battery cell.

3. The apparatus for preventing over-discharge of a battery according to claim 1, wherein the processor is configured to calculate the second drop voltage by using an internal resistance of the battery cell according to a temperature and a discharge current of the battery cell.

4. The apparatus for preventing over-discharge of a battery according to claim 1, wherein the processor is configured to calculate the reference voltage by using the following equation:

$$V_{ref} = V_{min} + I_o R_v + I_o R_i \qquad \text{<Equation>}$$

where $V_{ref}$ is the reference voltage, $V_{min}$ is the minimum operating voltage of the battery cell, $I_o$ is a discharge current of the battery cell, $R_v$ is the variable resistance of the current limiting resistor according to a temperature, and $R_i$ is an internal resistance of the battery cell according to the temperature.

5. The apparatus for preventing over-discharge of a battery according to claim 1, wherein the processor is configured to control operation states of the first switch and the second switch into a turn-on state, and control an operation state of the third switch into a turn-off state, when an output request signal is received.

6. The apparatus for preventing over-discharge of a battery according to claim 5, wherein the processor is configured to compare the cell voltage of the battery cell with the reference voltage to obtain a comparison result, and control the operation states of the first switch, the second switch and the third switch according to the comparison result.

7. The apparatus for preventing over-discharge of a battery according to claim 6, wherein the processor is configured to control the operation states of the first switch and the third switch into a turn-on state and control the operation state of the second switch into a turn-off state, when the cell voltage of the battery cell is equal to or lower than the reference voltage.

8. A battery pack, comprising the apparatus for preventing over-discharge of a battery according to claim 1.

9. An electronic device, comprising the apparatus for preventing over-discharge of a battery according to claim 1.

10. An apparatus for preventing over-discharge of a battery, the apparatus comprising:
- a first switch located on a first discharge path that electrically connects a battery cell and an output terminal;
- a second switch located on the first discharge path and having one end and another end respectively electrically connected to one end of the first switch and to the output terminal;
- a current limiting resistor located on a second discharge path that electrically connects a first node located between the first switch and the second switch and a second node located between the second switch and the output terminal, the current limiting resistor having one end electrically connected to the first node;
- a third switch located on the second discharge path and having one end and another end respectively electrically connected to one end of the current limiting resistor and to the second node; and
- a processor configured to set a reference voltage by using at least one of a minimum operating voltage of the battery cell, a first drop voltage by the current limiting resistor and a second drop voltage by an internal resistor of the battery cell, and control operation states of the first switch, the second switch and the third switch based on the reference voltage, wherein the processor is configured to calculate the reference voltage by using the following equation:

$$V_{ref} = V_{min} + I_o R_v + I_o R_i \qquad \text{<Equation>}$$

where $V_{ref}$ is the reference voltage, $V_{min}$ is the minimum operating voltage of the battery cell, $I_o$ is a discharge current of the battery cell, $R_v$ is a variable resistance of the current limiting resistor according to a temperature, and $R_i$ is an internal resistance of the battery cell according to the temperature.

11. The apparatus for preventing over-discharge of a battery according to claim 10, wherein the processor is configured to calculate the first drop voltage by using the variable resistance of the current limiting resistor according to a temperature and a discharge current of the battery cell.

12. The apparatus for preventing over-discharge of a battery according to claim 10, wherein the processor is configured to calculate the second drop voltage by using an internal resistance of the battery cell according to a temperature and a discharge current of the battery cell.

13. The apparatus for preventing over-discharge of a battery according to claim 10, wherein the processor is configured to control operation states of the first switch and the second switch into a turn-on state, and control an operation state of the third switch into a turn-off state, when an output request signal is received.

14. The apparatus for preventing over-discharge of a battery according to claim 13, wherein the processor is configured to compare a cell voltage of the battery cell with the reference voltage to obtain a comparison result, and control the operation states of the first switch, the second switch and the third switch according to the comparison result.

15. The apparatus for preventing over-discharge of a battery according to claim 14, wherein the processor is configured to control the operation states of the first switch and the third switch into a turn-on state and control the operation state of the second switch into a turn-off state, when the cell voltage of the battery cell is equal to or lower than the reference voltage.

16. A battery pack, comprising the apparatus for preventing over-discharge of a battery according to claim 10.

17. An electronic device, comprising the apparatus for preventing over-discharge of a battery according to claim 10.

18. The apparatus for preventing over-discharge of a battery according to claim 10, wherein the current limiting resistor is a positive temperature coefficient (PTC) device having a variable resistance that increases when a threshold temperature is reached.

\* \* \* \* \*